(12) United States Patent
Grant et al.

(10) Patent No.: US 6,643,059 B1
(45) Date of Patent: Nov. 4, 2003

(54) OPTICAL ARRAY AMPLIFIER

(75) Inventors: Michael F Grant, Bishops Stortford (GB); Robert Spagnoletti, Hertford (GB); Stephen Day, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 25 days.

(21) Appl. No.: 10/008,082

(22) Filed: Nov. 2, 2001

(51) Int. Cl.[7] .................. H04J 14/02; G02B 6/26; H01S 3/30
(52) U.S. Cl. ............... 359/341.32; 359/337.1; 359/134; 359/160
(58) Field of Search .............. 359/337.1, 337.21, 359/341.32, 134, 160

(56) References Cited

U.S. PATENT DOCUMENTS

| | | | |
|---|---|---|---|
| 3,273,072 A | * 9/1966 | Koester et al. | 359/337.1 |
| 4,818,062 A | * 4/1989 | Scifres et al. | 359/341.32 |
| 5,452,116 A | * 9/1995 | Kirkby et al. | 359/124 |
| 5,490,010 A | * 2/1996 | Sharma et al. | 359/341 |
| 6,314,115 B1 | * 11/2001 | Delfyett et al. | 372/6 |
| 6,373,623 B1 | * 4/2002 | Ohshima et al. | 359/341.3 |

OTHER PUBLICATIONS

Yamada et al, "Ultra–Broadband and gain–flattened EDFAs for WDM Signals", OSA Tops, vol. 16 pp 14–29, 1997.*
Ashari et al, Sch. of Phys., Electronics Lett., vol. 30, #20, pp 1674–1675; abstract only herewith, Sep. 29, 1999.*
Doerr, C.R., OFC/IOOC'99, Opt. Fibre Commun. Conf., pp. 24–26; abstract only herewith, Feb. 26, 1999.*

* cited by examiner

Primary Examiner—Nelson Moskowitz
(74) Attorney, Agent, or Firm—Barnes & Thornburg

(57) ABSTRACT

An optical array amplifier has a first light beam shaper, a first waveguide to guide an input optical signal consisting of a plurality of wavelengths to the first beam shaper, a diffracter illuminated by light from the first beam shaper to diffract the optical signal into individual wavelengths or groups of wavelengths, a second waveguide connected to a source of optical pump energy, a second beam shaper combining optical pump energy from the second waveguide with the diffracted signal wavelengths or groups of wavelengths without the pump energy impinging on the diffracter, so that a proportion of the optical pump energy is mixed with each of the wavelengths or groups of wavelengths, and to focus the mixed optical signals onto a third waveguide connected to an optical amplifier utilizing the pump energy to cause amplification of the individual wavelengths or groups of wavelengths mixed with the corresponding proportion of pump energy. The amplifier may be implemented as a planar waveguide device. Optical attenuators connected to the outputs of the device may be controlled in dependence on the amplitude of the signals. The amplitude and/or phase of the pumping energy may also be dependent on the amplitude of the signals.

26 Claims, 6 Drawing Sheets

OPTICAL ARRAY AMPLIFIER

FIELD OF THE INVENTION

The present invention is concerned with an optical array amplifier, particularly, but not exclusively, for use in optical telecommunications systems and networks employing wave division multiplexing (WDM). More specifically, the invention concerns method and apparatus for achieving amplification of optical signals and also optical signals amplified by the method or apparatus.

BACKGROUND OF THE INVENTION

Optical transmission systems and networks have become increasingly more accepted as a preferred mode for carrying communications traffic over large distances. One particular mode of optical communication that has gained acceptance recently involves the multiplexing of large numbers of wavelengths onto a single fibre. In this way, the bandwidth of an optical fibre carrying communications traffic can be massively increased, implying a vastly improved capacity for traffic.

Such systems are generally known as Wave Division Multiplex (WDM) systems. Point-to-point, long-haul systems are currently proposed in which 160 or even up to 640 wavelengths may be employed. Such systems require wavelength division multiplexers/demultiplexers and optical amplifiers to ensure proper transmission between nodes throughout the system or network.

In order to enhance the flexibility of these systems, there is a need to allow a range of operations to be made possible. For example, it is advantageous, if not necessary, for individual wavelengths or groups of wavelengths to be added or dropped at intermediate nodes in a network and for so-called "express" wavelengths to bypass certain nodes.

Systems providing these capabilities are complex to design, principally because the demultiplexing, filtering and switching components that are needed to split and route wavelengths are "lossy" and therefore require the use of amplification to compensate for this loss. To complicate matters further, some of the wavelengths may require significantly different amplification, depending on factors such as whether they are to be added, dropped or bypassed at the node in question, and the distance travelled before the node or to be travelled after the node. Some of these may be in conflict with one another and can add significantly to the cost of designing the system.

Known ways of overcoming these problems have been ineffective in practice and/or ineffective in cost terms. For example, perhaps the obvious way of addressing per wavelength amplification in a WDM network is literally to demultiplex the wavelengths and to use a separate amplifier for each. This approach carries an inordinate cost penalty. Each wavelength or group of wavelengths would require a complete optical amplifier, including pump, WDM multiplexer, VOA, Erbium-doped fibre and controller.

An alternative approach that attempts to share some of these components would involve placing the amplifier upstream of the WDM demultiplexer. All wavelengths would then be amplified simultaneously and to approximately the same extent. However, this arrangement would not necessarily generate the high signal output powers that are often required to overcome the lossy optical components that are in use at, for example, an optical flexibility node. The approach is clearly less flexible than one in which each wavelength is processed individually, in terms of amplification and equalisation.

A further approach involves the use of a compact array of semiconductor optical amplifiers (SOAs). Such arrays are smaller and of lower cost than comparable arrays of Erbium-doped fibre amplifiers (EDFAs) but exhibit a poorer performance.

However, none of these techniques satisfactorily resolves the problems identified above and does not offer an acceptable compromise in terms of cost and performance.

SUMMARY OF THE INVENTION

The above and other disadvantages are overcome by the present invention which, in its broadest sense, provides an optical amplifier offering a cost effective means of achieving per-wavelength amplification. In its preferred form, it eliminates large numbers of passive devices and drastically reduces fibre handling. The amplifier of the invention also provides a building block that can be integrated with other devices, such as taps, variable optical attenuators, opto-electronics and electronics in such a way as to enable highly integrated subsystems to be created.

In a first aspect, the invention provides an optical array amplifier comprising:

a first light beam shaper;
    a first waveguide adapted to guide an input optical signal consisting of a plurality of wavelengths to said first beam shaper;
    a diffracter adapted to be illuminated by light from said first beam shaper whereby to diffract said optical signal into individual wavelengths or groups of wavelengths thereof,
    a second waveguide adapted to be connected to a source of optical pump energy;
    a second beam shaper adapted to combine optical pump energy from said second waveguide with said diffracted signal wavelengths or groups of wavelengths without said pump energy impinging on said diffracter, such that a proportion of said optical pump energy is mixed with each said wavelength or group of wavelengths, and to focus the mixed optical signals onto a third waveguide adapted to be connected to an optical amplifier utilising said pump energy to cause amplification of the individual wavelengths or groups of wavelengths mixed with the corresponding proportion of pump energy.

In a second aspect, the invention provides a method of amplifying an optical signal consisting of a plurality of wavelengths, the method comprising:

guiding said optical signal through a first waveguide to a first beam shaper;
shaping said optical signal in said first beam shaper so as to direct said optical signal onto a diffracter;
diffracting said optical signal by said diffracter into individual wavelengths or groups of wavelengths thereof;
mixing optical pump energy provided through a second waveguide from a source thereof with said diffracted signal wavelengths or groups of wavelengths without said pump energy impinging on said diffracter, such that a proportion of said optical pump energy is mixed with each said wavelength or group of wavelengths; and
directing the mixed optical signals through a second beam former onto a third waveguide adapted to be connected to an optical amplifier utilising said pump energy to cause amplification of the individual wavelengths or groups of wavelengths mixed with the corresponding proportion of pump energy.

The array amplifier may be implemented as a planar waveguide array or as a bulk optical device. There may be one or more pump sources. More than two pump energy waveguides may be provided, their position in the second beam shaping region being tailored to suit the required output characteristics. Sources of pumping energy may be co-located on the waveguide array package. The beam shaping elements may be mirrors or lenses or regions of a planar waveguide, the diffractive element may be a bulk diffraction grating or a waveguide array or these elements may be combined into a grating element which also provides the beam shaping, such as an "Echelle grating".

Amplification may be effected in Erbium-doped fibres or waveguides connected to the third waveguides. The outputs may be attenuated in dependence on the amplitude of the output signals. The power level of the one or more pump sources may similarly be controlled. The phase and/or amplitude of the pump source may also be controlled, for example by mode shaping resulting from variation in the cross-section of the pump waveguide(s).

By way of specific example, the invention can be based on planar integrated optics using an Arrayed Waveguide Grating Wavelength Division Multiplexer (AWG-WDM). The waveguide amplifiers can be based on planar integrated optics or optical fibres, with the optical amplification being by means of doping with, for example, Erbium, or by alternate non-linear optical means, such as Raman amplification.

The optical signals are preferably wavelength modulated optical communication signals.

The invention also provides a gain flattening filter, incorporating an optical amplifier as defined in the above paragraphs. The invention yet further provides an optical add/drop device incorporating an optical amplifier as defined in any of the previous paragraphs.

BRIEF DESCRIPTION OF THE DRAWINGS

The invention will be described with reference to the following drawings, in which.

DETAILED DESCRIPTION OF THE ILLUSTRATED EMBODIMENTS

Figure 1:
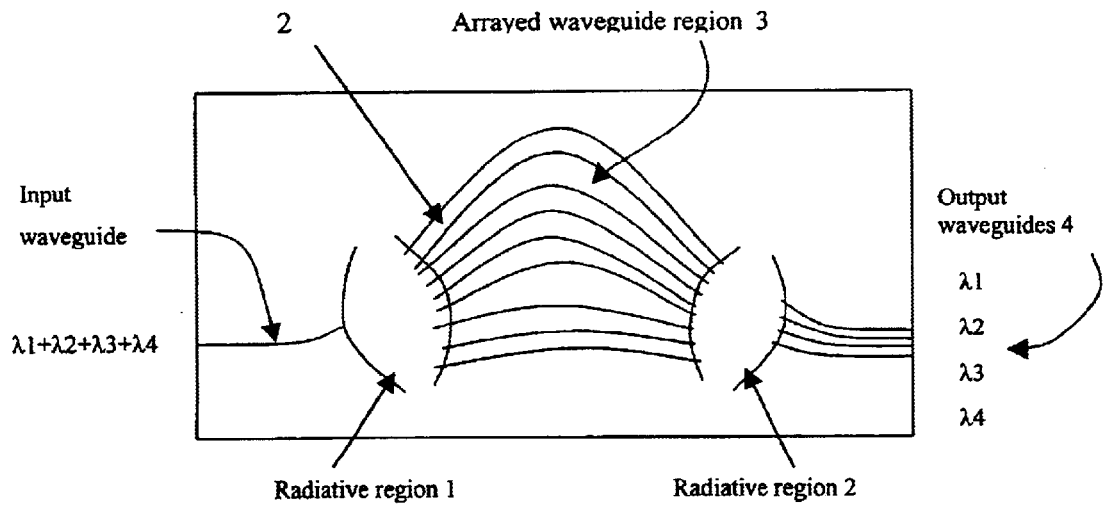
FIG. 1 is a schematic representation of a "standard" arrayed waveguide wave division multiplex arrangement.

Referring first to FIG. 1, in a "standard" Arrayed Waveguide WDM, commonly abbreviated to AWG WDM, multiple optical channels represented by $\lambda 1, \lambda 2, \lambda 3, \lambda 4$ enter the AWG WDM on an input waveguide to a first planar waveguide radiative region 1. There, the light is fanned out to an array of output waveguides 2, a portion of the input light being thereby coupled into each output waveguide. These waveguides are then taken through paths of different lengths, forming the array waveguide region 3, into a second radiative region 2 where they are recombined and focused onto the output waveguides 4.

The effect of the AWG is similar to a grating and therefore the focal position at the output of radiative region 2 is wavelength-dependent, thus performing a wavelength-dependent demultiplexing function. The device has been described with signal flow left to right. However, it can alternatively be operated in the reverse sense to constitute a wavelength multiplexer.

Figure 7:
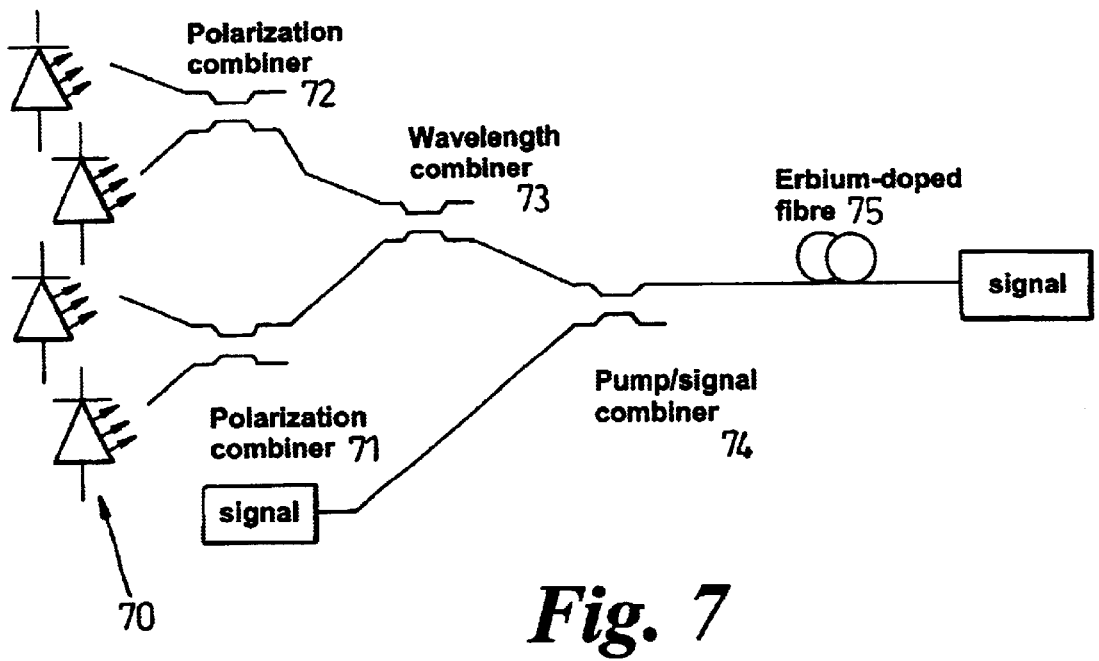
FIG. 7 represents schematically a typical optical pumping arrangement.

An implementation of a standard Erbium Doped Optical Amplifier (EDFA) is illustrated in FIG. 7. Optical pumping at a wavelength, typically 980 nm or 1480 nm or a combination of these, is provided in order to provide signal gain in an Erbium doped fibre 75. In order to provide sufficient gain in the fibre, a plurality of optical pump sources, such as lasers indicated generally at 70, are often employed. FIG. 7 polarization combiners 71, 72 and a wavelength combiner 73 designed to combine the various pump sources in as efficient manner as possible, commensurate with cost. As well as increasing the total pump power available, use of multiple pumps also has enhanced reliability when compared with a single pump. The optical communication signal is itself combined with the pumping wavelengths in a pump/signal combiner 74. The arrangement can be used in forward or counterpumping modes.

In order to put into perspective the numbers of components necessary to perform the required amplification in, for example, a 40-channel network, the above configuration for a single channel just described with reference to FIG. 7, would entail 60 pumps, 80 polarization combiners, 40 wavelength combiners, 40 pump/signal combiners/multiplexers and 40 Erbium-doped fibres. It can readily be seen, therefore, that the standard configuration is demanding in numbers and costs of components.

Figure 2:
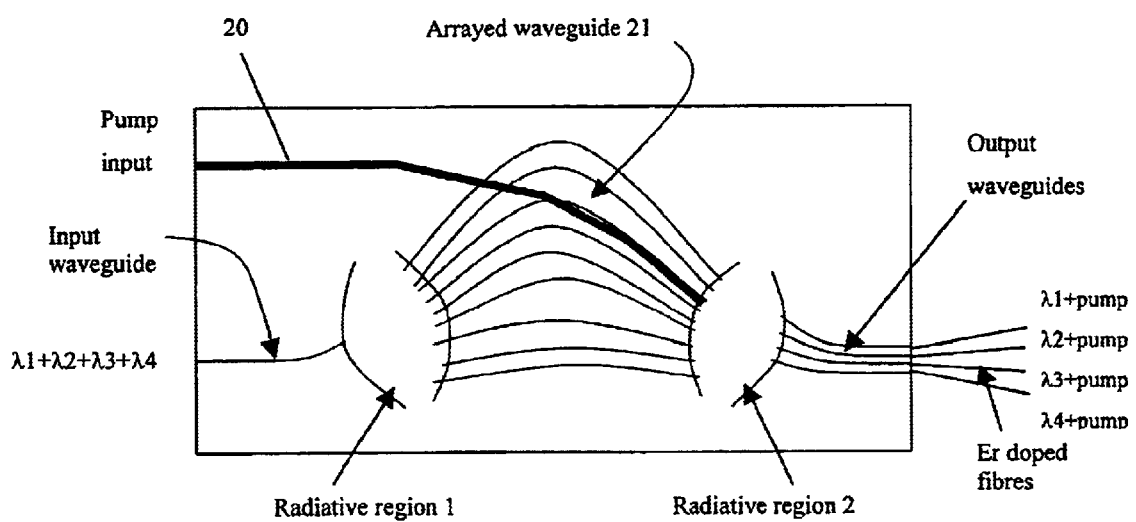
FIG. 2 is a schematic representation of a first embodiment of the invention.

Referring now to a first embodiment of the invention, as shown schematically in FIG. 2, a single input pump waveguide 20 enters the AWG and is conducted through the arrayed waveguide region 21, completely by-passing radiative region 1, and enters radiative region 2 at or around its centre so that is has as nearly uniform an illumination of the output waveguides as possible. Each output waveguide will there-fore contain a single wavelength, or small group of wavelengths, mixed with a proportion of the total available pump power. Each output waveguide is then coupled to an Erbium doped optical fibre, where the output wavelength, or group of wavelengths is amplified. This configuration dispenses entirely with the bulk of the (costlier) components of the standard configuration described above.

Figure 3:
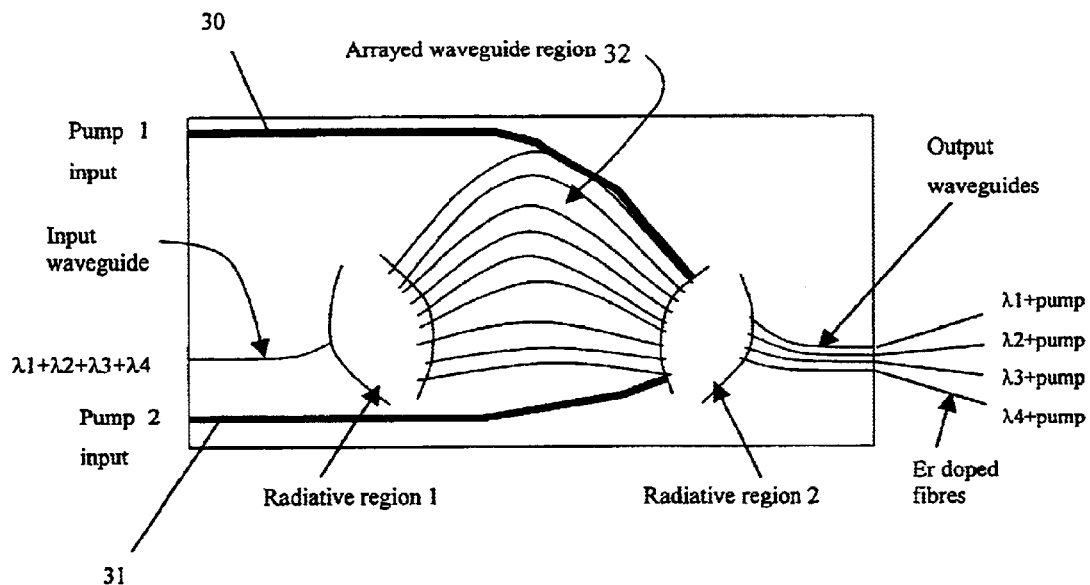
FIG. 3 is a schematic representation of a second embodiment.

FIG. 3 illustrates an alternative configuration in which optical pumping radiation from two sources is input via respective waveguides 30, 31 to the AWG, through the arrayed waveguide region 32 and into locations near the two extremities of the second radiative region. The presence of two pumping sources has the potential to increase overall gain and to provide more even or tailored illumination in the second radiative region 2. If the pumping source waveguides are located within the second radiative region according to a particular philosophy, the wavelengths in certain channels may be subjected to different levels of amplification if desired. Additionally, the power output of each pump could be varied in order to further control the of amplification. Otherwise, each wavelength could be subjected to substantially the same amplification. This approach is of course not limited only to two pump waveguides—in fact, the greater the number of separate sources employed, the greater the degree of freedom to tailor the distribution of optical pump power in the output waveguide array.

Figure 4:
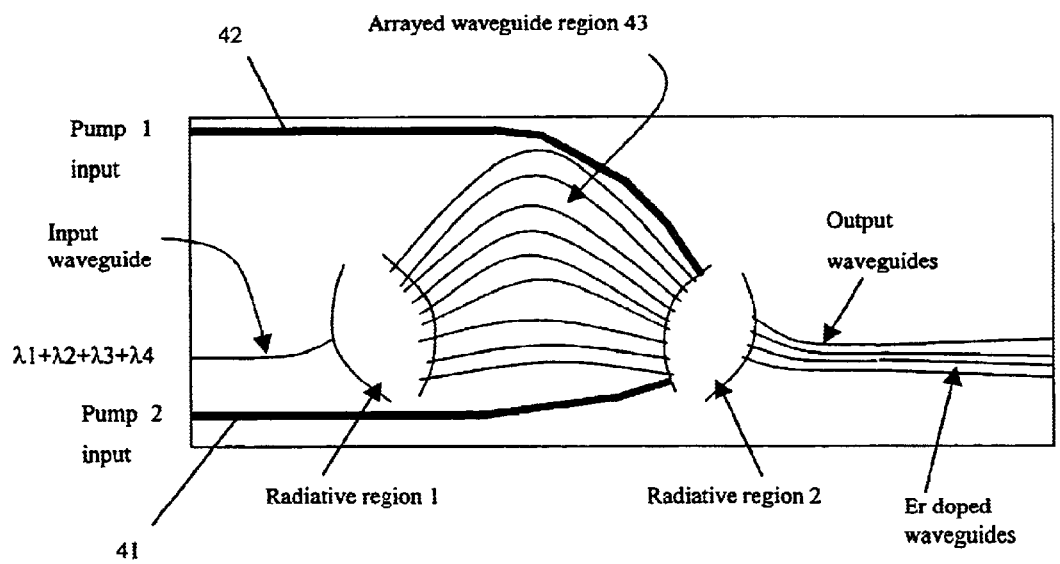
FIG. 4 is a schematic representation of a third embodiment.

FIG. 4 illustrates a variation on the double pumped configuration shown in FIG. 3, where the Erbium doped fibre outputs are replaced by Erbium doped waveguides integrated with the device.

Figure 5:
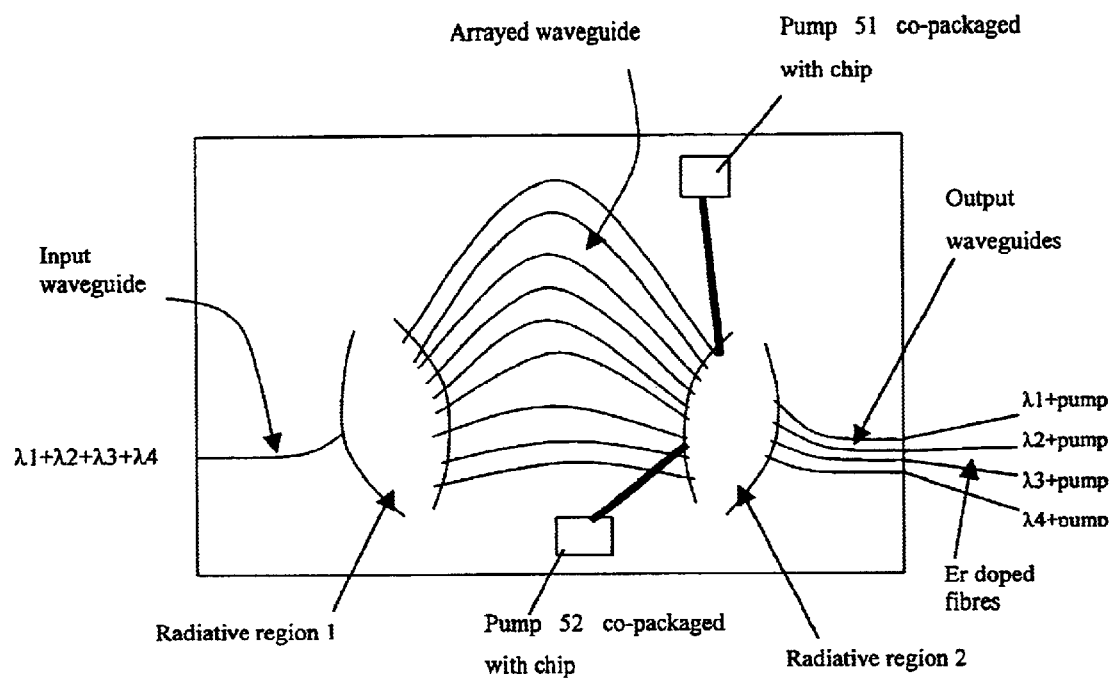
FIG. 5 is a schematic representation of a fourth embodiment.

FIG. 5 illustrates another configuration in which two optical pumping sources 51, 52 are packaged (ie co-packaged) on the same chip as the AWG itself. Clearly, this configuration has the advantage of being more compact and selfcontained.

Figure 6:
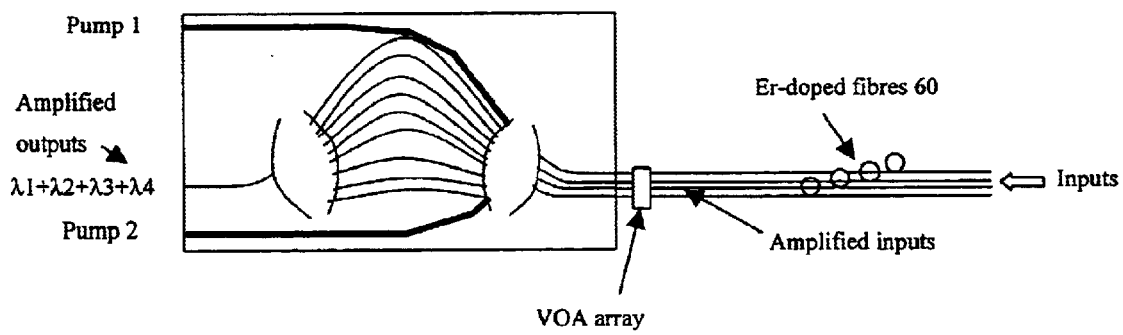
FIG. 6 is a schematic representation of a fifth embodiment

FIG. 6 illustrates another specific implementation of the invention. This shows the combination of the invention with a Variable Optical Attenuator Array (VOA), which provides for individually controlled gain of each channel. In this configuration, the VOA not only attenuates the amplified wavelength, but also the pump wavelength that provides the amplification. It should be understood, however, that any of the above described configurations or indeed any falling within the scope of the invention, could be used instead.

In practice, there are certain problems with amplification that can be addressed by the invention. For example, the gain response of an EDF is not necessarily flat; it tends to tail off by typically 2 db at its extremities. This gain "loss" is cumulative across a plurality of fibres. Much effort is therefore devoted to equalising this gain/loss characteristic of EDFs.

The present invention can be used to construct a gain-flattening filter for use anywhere in an optical communication network that requires per wavelength amplification. In the FIG. 6 example, if signal flow is from left to right, a variable optical attenuator (VOA) could be placed at the "downstream" (right hand) side of the EDFs 60 so that the signals are amplified by the pumped EDFs upstream of the attenuator, thereby reducing noise artefacts. Conversely, if signal flow is right to left, the VOA will be placed between the AWG and the EDFs, In this way, the EDF can compensate for any loss in the array without the need for post-amplification. It also has the advantage of altering the threshold for damage resulting from over-amplification.

Figure 8:
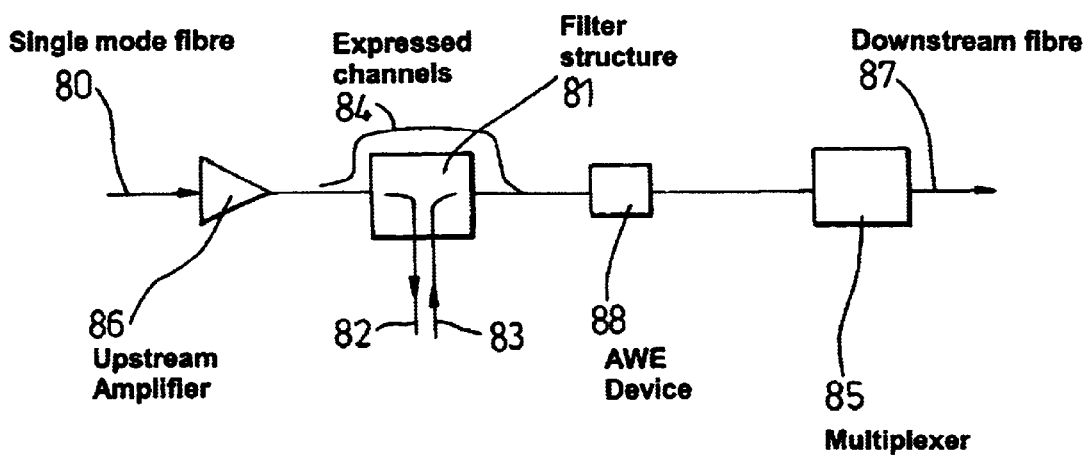
FIG. 8 is a schematic representation of an application of the invention.

In another implementation, illustrated schematically in FIG. 8, the AWG of the invention can be used as part of an "add/drop" multiplexer. A typical signal path may include a single mode fibre 80, designed to carry 40 communication channels. A filter structure 81 provides the means by which channels/wavelengths may be dropped from the path and by which others may be added, as indicated by the arrows 82, 83 respectively. For example, in a 40-channel system, 10 channels, say, may be dropped at 82 and another 10 added at 83. The other 30 channels may be "expressed" at 84 to bypass the filter structure 81. The ongoing 40 channels pass through a multiplexer 85 before connection to the downstream fibre 87.

If optical switching is used to perform the add/drop, there is an additional loss, as well as that encountered by the conversion and demultiplexing/multiplexing operations.

Conventionally, an upstream amplifier 86 is used to provide enough gain to carry the signals to the downstream fibre 87. By utilising the present invention, the AWG device 88 can be located between the demultiplexer and the multiplexer where only per-wavelength amplification is feasible since the 40 incoming channels have been demultiplexed into their individual wavelengths by the demultiplexer 85 in this region. Using the "conventional" techniques for per-wavelength amplification would therefore entail 40 EDFAs, 40 semiconductor laser amplifiers and so on and would be costly once again.

Figure 9:
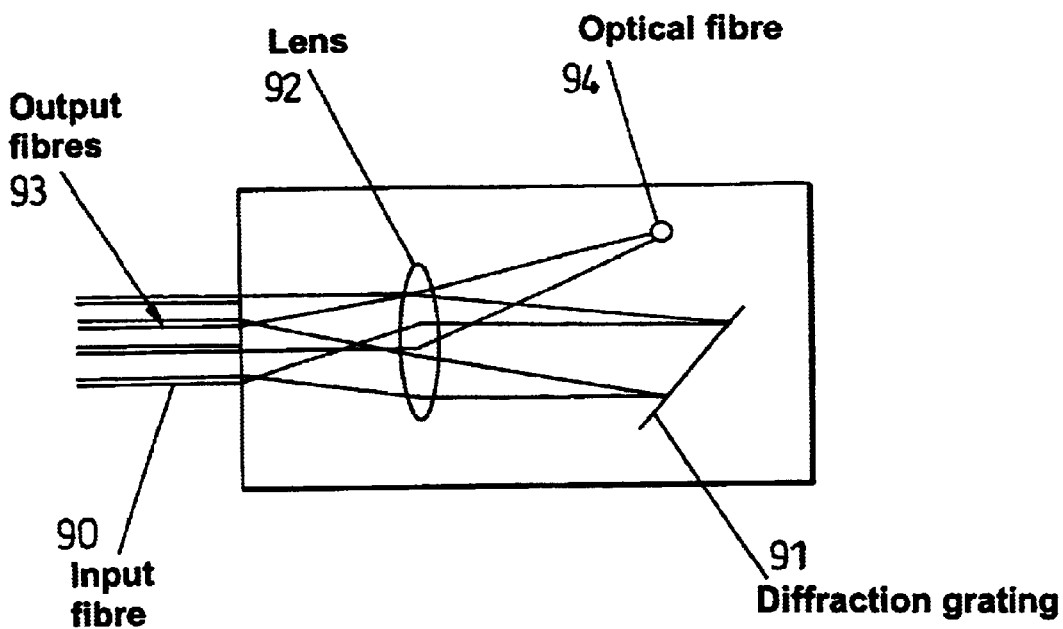
FIG. 9 is a schematic representation of an implementation of the invention.

Although the invention has thus far been described in the context of planar waveguides, it could be implemented alternatively. Referring to FIG. 9, an input optical signal, comprising a plurality of wavelengths, is launched through an input fibre 90. The signal is focused through lens 92 onto a diffraction grating 91 in which the beam is split into individual wavelengths or groups of wavelengths which are then refocused by the lens 92 onto a plurality of output paths where the separate wavelengths or groups of wavelengths can be collected, for example by output fibres 93. A further optical waveguide, typically another optical fibre terminating at 94, is arranged to introduce into the space between the lens 92 and the diffraction grating 91, a source of optical pump energy. This energy does not impinge on the diffraction grating but is focused by the lens 92 so that a portion of the energy is directed onto each of the fibres 93 where it mixes with the respective wavelengths or groups of wavelengths for utilisation by optical amplifiers, such as Erbium-doped fibres, connected to the output fibres.

Figure 10:
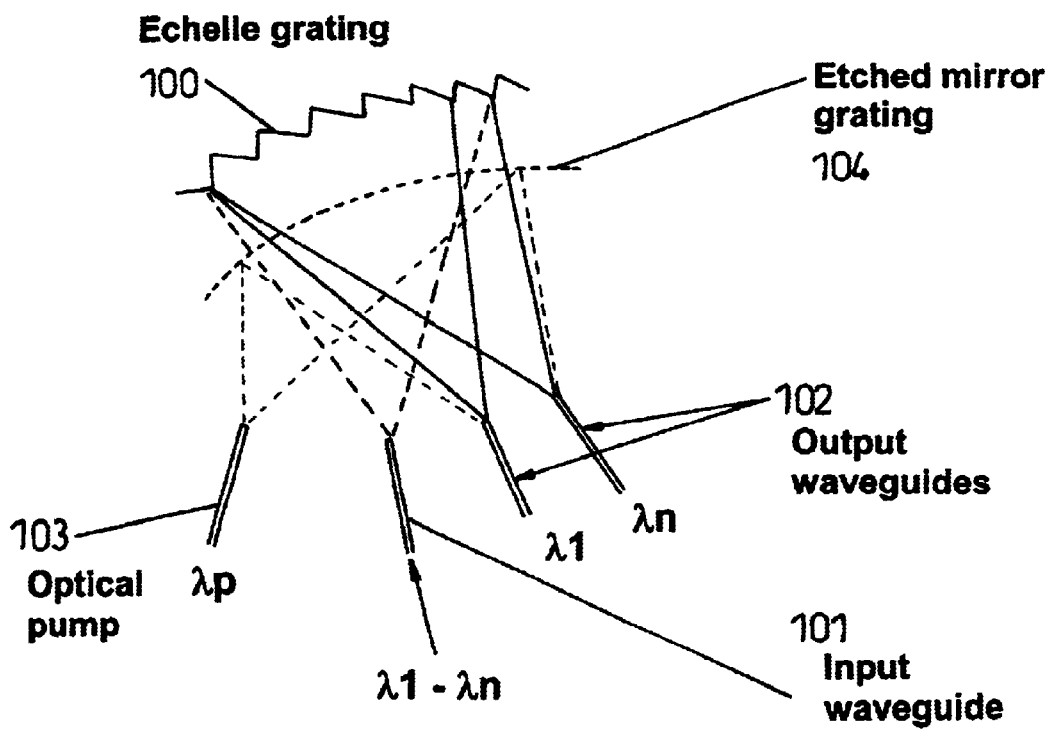
FIG. 10 is a schematic representation of a further implementation of the invention.

Another exemplary arrangement is illustrated in FIG. 10, in which an Echelle grating 100 is used as both the diffraction means and the second beam shaping means. An input optical beam from input waveguide 101, containing a plurality of wavelengths, fans out onto the Echelle grating 100 which causes the individual wavelengths or groups of wavelengths to be focused onto output waveguides 102, such as optical fibres. A source 103 of optical pump energy $\lambda p$ illuminates an etched mirror grating 104 or the like so as to reflect the pumping light across the output fibres 102 without illuminating the Echelle grating. Signal wavelengths diffracted from the Echelle grating pass through the etched mirror grating 104 on the path to the fibres. The pumping light and the signal wavelengths may suffer a power loss in this arrangement. This may be an advantage in certain circumstances, otherwise there is sufficient gain in the system for this particular loss to be acceptable in the interests of improved overall amplification.

In a similar vein, it may be convenient to arrange that the power level of the pump source leads to under-pumping of any amplifier connected to the device output. The device can then operate as an attenuator rather than an amplifier, providing up to around 20–30 dB loss rather than 20–30 dB gain.

Figure 11:
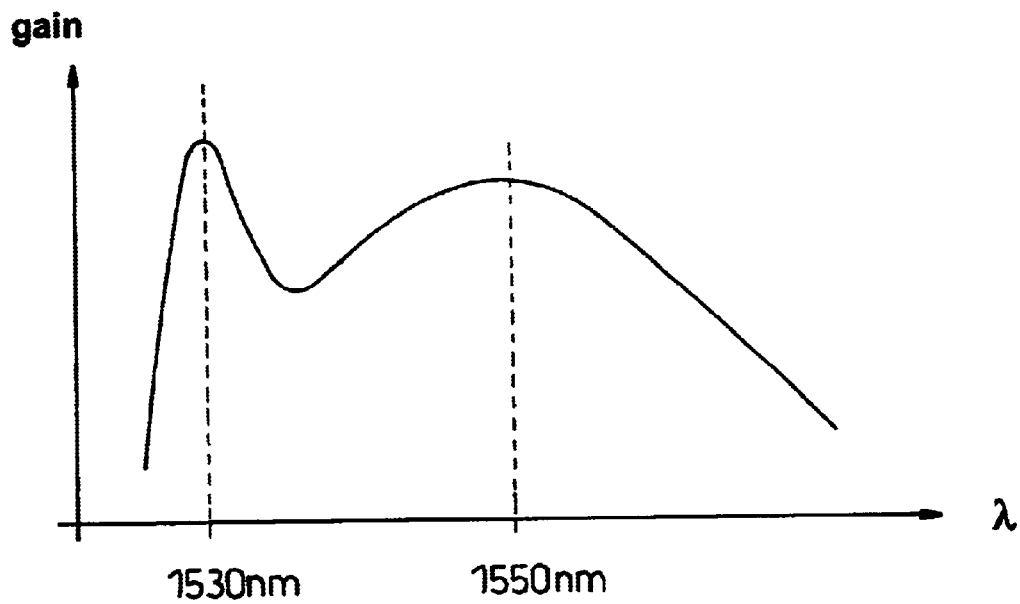
FIG. 11 is a typical gain response curve for an Erbium-doped fibre.

FIG. 11 shows a typical gain response for an Erbium doped fibre amplifier. There are two predominant peaks (at around 1530 and 1550 nm respectively) in the response. If the wavelength components of the overall response are considered in the same manner as the individual wavelengths of a multi-wavelength (ie WDM) input optical signal, the gain of each wavelength component can be adjusted to produce a substantially flat overall response.

Figure 12:
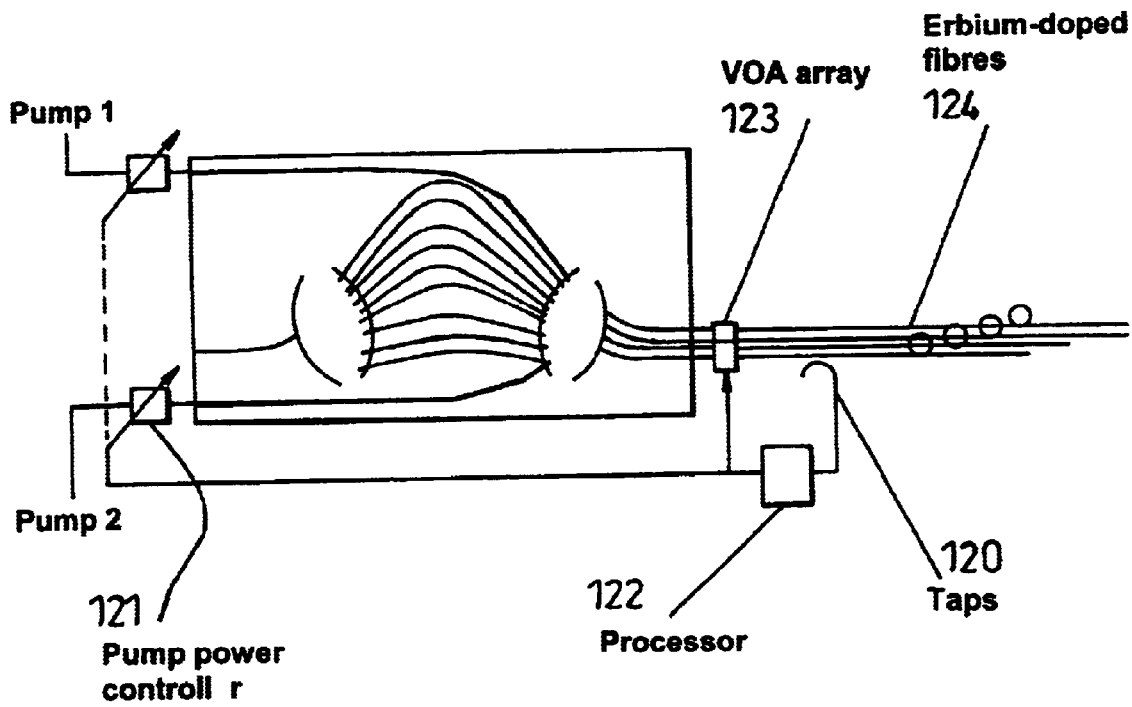
FIG. 12 is a schematic representation of an implementation of the invention incorporating a control mechanism.

Thus, in FIG. 12 the basic arrangement of FIG. 6 is modified by the addition of taps 120 arranged to monitor the outputs from the device. The taps connect to a processor 122 which examines the output level and produces a control signal in dependence on the variation between actual and desired output level. The control signal can then be used to adjust the VOA array 123 and/or pump power controller 121 connected to adjust the power level of the pump source. Where there is more than one controller 121, each such controller may thus be controlled, as indicated by the broken line in FIG. 12. In this way, the gain response of the amplifier can be regulated to produce a flat response. Indeed, the gain response can be tailored by this technique to produce a response of any desired shape, within the limits of amplification of each wavelength component. Of course, the greater the number of pump sources, the greater the opportunity for fine tuning the gain response. The Er fibres 124 can also be individually tailored to be different lengths, or to have different doping characteristics in order to further optimise the performance of the device.

The phase and amplitude of the pump power can be made adjustable. A narrow waveguide is capable of carrying light in a single mode with a Gaussian distribution over the cross-section. Wider waveguides are successively capable of supporting second, third etc order propagation. Imagine a single mode, narrow waveguide being split into two single mode waveguides. If these waveguides are subsequently recombined but with a phase reversal in one path compared to the other, the resultant distribution would correspond to a second order mode. In like manner, third and higher orders can be "created". In general terms, $2^n$ Erbium doped waveguide amplifiers (EDWAs) can be pumped with n+1 pump sources if one pump feeds odd numbered EDWAs, a second pump feeds even numbered EDWAs, a third pump feeds EDWAs numbered 1,2 and 5,6 etc and the nth pump has its power distributed spatially across the array of EDWAs in a sinusoidal fashion. Variation of the pump powers in this way enables the power distribution to be adjusted at will. This technique can be employed in the present invention as a means to adjust the pump powers (and possibly also their phase distribution) applied to the output waveguide means of the device according to the invention.

What we claim is:

1. An optical array amplifier comprising:
   a first light beam shaper;
   a first waveguide adapted to guide an input optical signal consisting of a plurality of wavelengths to said first beam shaper;
   a diffracter adapted to be illuminated by light from said first beam shaper whereby to diffract said optical signal into individual wavelengths or groups of wavelengths thereof;
   a second waveguide adapted to be connected to a source of optical pump energy;
   a second beam shaper adapted to combine optical pump energy from said second waveguide with said diffracted signal wavelengths or groups of wavelengths without said pump energy impinging on said diffracter, such that a proportion of said optical pump energy is mixed with each said wavelength or group of wavelengths, and to focus the mixed optical signals onto a third waveguide adapted to be connected to an optical amplifier utilising said pump energy to cause amplification of the individual wavelengths or groups of wavelengths mixed with the corresponding proportion of pump energy, wherein the power level of the optical pump energy is adjustable in dependence on the sensed amplitude of signals from the third waveguide.

2. An optical array amplifier as claimed in claim 1, wherein said first and second waveguides comprise channel waveguides and said first and second beam shapers comprise respective first and second planar radiative regions of a planar waveguide array, the second waveguide entering the second radiative region so as to enable said pump energy to mix with said diffracted optical signals.

3. An optical array amplifier as claimed in claim 2, wherein said second waveguide comprises a planar waveguide adapted to carry pump energy to a central location within said second radiative region.

4. An optical array amplifier as claimed in claim 2, wherein said second waveguide comprises a plurality of waveguides adapted to carry respective pump energy to respective locations within said second radiative region.

5. An optical array amplifier as claimed in claim 4, wherein respective sources of said pump energy are co-packaged with the planar waveguides.

6. An optical array amplifier as claimed in claim 1, wherein said first beam shaper comprises a first lens, said diffracter comprises a diffraction grating, and said second beam shaper comprises the first lens.

7. An optical array amplifier as claimed in claim 1, wherein said first beam shaper and said diffracter are comprised by an Echelle grating, and said second beam shaper comprises an etched mirror grating.

8. An optical array amplifier as claimed in claim 2, further comprising Erbium doped waveguides coupled to said third waveguide, whereby said proportion of pump energy causes amplification within said Erbium doped waveguides.

9. An optical array amplifier as claimed in claim 8, wherein said Erbium doped waveguides are formed as waveguides coupled to the third waveguide.

10. An optical array amplifier as claimed in claim 8, wherein said Erbium doped waveguides are formed by fibres connected to the third waveguide.

11. An optical array amplifier as claimed in claim 2, further comprising an array of variable optical attenuators adapted to control the degree of attenuation of signals from the third waveguide in dependence on the sensed amplitude of said signals.

12. An optical array amplifier as claimed in claim 2, wherein the amplitude and phase distribution of the pump energy in the third waveguide is variable.

13. An optical array amplifier as claimed in claim 12, wherein the variation in amplitude and phase distribution is effected by said second waveguide having a cross-sectional profile adapted to provide mode shaping thereof.

14. A method of amplifying an optical signal consisting of a plurality of wavelengths, the method comprising:
   guiding said optical signal through a first waveguide to a first beam shaper;
   shaping said optical signal in said first beam shaper so as to direct said optical signal onto a diffracter;
   diffracting said optical signal by said diffracter into individual wavelengths or groups of wavelengths thereof;
   mixing optical pump energy provided through a second waveguide from a source thereof with said diffracted signal wavelengths or groups of wavelengths without said pump energy impinging on said diffracter, such that a proportion of said optical pump energy is mixed with each said wavelength or group of wavelengths;
   directing the mixed optical signals through a second beam shaper onto a third waveguide adapted to be connected to an optical amplifier utilising said pump energy to cause amplification of the individual wavelengths or groups of wavelengths mixed with the corresponding proportion of pump energy;

and adjusting the power level of the optical pump energy in dependence on the sensed amplitude of signals in the third waveguide.

15. A method as claimed in claim 14, wherein the optical signals are wavelength division modulated optical communication signals.

16. A method as claimed in claim 14, wherein the first beam shaping step is performed by passing the optical signal through a first radiative region of a planar waveguide whereby the optical signal beam is spread onto a plurality of waveguides in a planar waveguide array; said diffraction step is performed by injecting light beams from the planar array into a second radiative region; and said second beam shaping step and said mixing step are performed together by passing optical pump energy from said source through one or more second planar waveguides into said second radiative region where said optical pump energy mixes with said individual wavelengths or groups of wavelengths.

17. A method as claimed in claim 14, wherein said first beam shaping step is performed by a first lens, said diffraction step is performed by a diffraction grating and said second beam shaping step is performed by said first lens.

18. A method as claimed in claim 14, wherein said first beam shaping step and said diffracting step are performed by an Echelle grating; and said mixing step is performed by directing said optical pump energy onto an etched mirror grating such that the diffracted pump energy is directed to said third waveguide.

19. A method as claimed in claim 16, wherein the optical pump energy is introduced through a planar waveguide into a central location of said second radiative region.

20. A method as claimed in claim 16, wherein the optical pump energy is introduced through a plurality of planar waveguides into respective locations of said second radiative region.

21. A method as claimed in claim 16, further comprising directing said mixed signal wavelengths or groups of wavelengths and said proportion of pump energy into Erbium doped waveguides whereby said proportion of pump energy causes amplification within said Erbium doped waveguides.

22. A method as claimed in claim 21, wherein said Erbium doped waveguides are formed as planar waveguides coupled to the third waveguide.

23. A method as claimed in claim 21, wherein said Erbium doped waveguides are formed by fibres connected to the third waveguide.

24. A method as claimed in claim 21, further comprising the step of controlling degree of attenuation of the signals output from the third waveguide in dependence on sensed amplitude of said signals.

25. A method as claimed in claim 16, further comprising the step of varying the amplitude and phase distribution of the pump energy in the third waveguide.

26. A method as claimed in claim 19, wherein the step of varying the amplitude and phase distribution of the pump energy is performed by mode shaping by varying the cross-sectional profile of the second waveguide.

* * * * *